(12) United States Patent
Yamazaki et al.

(10) Patent No.: US 11,823,600 B2
(45) Date of Patent: *Nov. 21, 2023

(54) DISPLAY SYSTEM AND VEHICLE

(71) Applicant: Semiconductor Energy Laboratory Co., Ltd., Kanagawa-ken (JP)

(72) Inventors: Shunpei Yamazaki, Tokyo (JP); Yoshiyuki Kurokawa, Kanagawa (JP)

(73) Assignee: Semiconductor Energy Laboratory Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/984,527

(22) Filed: Nov. 10, 2022

(65) Prior Publication Data

US 2023/0063933 A1 Mar. 2, 2023

Related U.S. Application Data

(63) Continuation of application No. 16/705,657, filed on Dec. 6, 2019, now Pat. No. 11,501,675, which is a continuation of application No. 15/587,983, filed on May 5, 2017, now Pat. No. 10,504,489.

(30) Foreign Application Priority Data

May 10, 2016 (JP) .................................. 2016-094469

(51) Int. Cl.
*G09G 3/3225* (2016.01)
*G09G 3/00* (2006.01)
(Continued)

(52) U.S. Cl.
CPC ............... *G09G 3/03* (2020.08); *B60K 35/00* (2013.01); *G09G 3/3225* (2013.01); *G09G 5/14* (2013.01);
(Continued)

(58) Field of Classification Search
CPC ................... G09G 5/14; G09G 3/3225; G09G 2310/0232; G09G 2340/04;
(Continued)

(56) References Cited

U.S. PATENT DOCUMENTS

| 10,019,052 B2 | 7/2018 | Lee et al. |
| 2003/0134488 A1 | 7/2003 | Yamazaki et al. |

(Continued)

FOREIGN PATENT DOCUMENTS

| EP | 2 648 066 A2 | 10/2013 |
| JP | 2005-112251 A | 4/2005 |

(Continued)

*Primary Examiner* — Robert J Michaud
(74) *Attorney, Agent, or Firm* — Husch Blackwell LLP

(57) ABSTRACT

A display system and vehicle that have novel structures are provided. The display system includes a display panel, a correction circuit, and a memory circuit. The display panel is flexible. The display panel includes a display region and a non-display region. The memory circuit has a function of storing first data about the display region and second data about the non-display region. The non-display region has a region which overlaps with the display region when the display panel is bent. The correction circuit has a function of generating image data to be written to pixels in the display region on the basis of the first data and the second data.

13 Claims, 13 Drawing Sheets

(51) Int. Cl.
  *B60K 35/00* (2006.01)
  *G09G 5/14* (2006.01)

(52) U.S. Cl.
  CPC  *B60K 2370/152* (2019.05); *B60K 2370/1533* (2019.05); *B60K 2370/331* (2019.05); *G09G 2310/0232* (2013.01); *G09G 2340/04* (2013.01); *G09G 2340/14* (2013.01); *G09G 2380/10* (2013.01)

(58) Field of Classification Search
  CPC ........... G09G 2340/14; G09G 2380/02; G09G 2340/10; B60K 35/00; B60K 2370/152; B60K 2370/1533; B60K 2370/331
  See application file for complete search history.

(56) References Cited

U.S. PATENT DOCUMENTS

| | | |
|---|---|---|
| 2003/0162312 A1 | 8/2003 | Takayama et al. |
| 2005/0024293 A1 | 2/2005 | Sakata. et al. |
| 2005/0052348 A1 | 3/2005 | Yamazaki et al. |
| 2006/0181839 A1 | 8/2006 | Yamada |
| 2011/0007042 A1 | 1/2011 | Miyaguchi |
| 2012/0314512 A1 | 12/2012 | Kurokawa |
| 2013/0278624 A1* | 10/2013 | Abe ................ G09G 5/363 345/619 |
| 2015/0035777 A1 | 2/2015 | Hirakata et al. |
| 2015/0084003 A1 | 3/2015 | Kim et al. |
| 2015/0338990 A1 | 11/2015 | Bae et al. |
| 2016/0284320 A1* | 9/2016 | Akaishi ................ G09G 5/39 |
| 2017/0178290 A1* | 6/2017 | Sugiura ................ G09G 5/005 |
| 2019/0033919 A1 | 1/2019 | Hirakata et al. |
| 2019/0227600 A1 | 7/2019 | Hirakata et al. |

FOREIGN PATENT DOCUMENTS

| | | |
|---|---|---|
| JP | 2006-251601 A | 9/2006 |
| JP | 2013-134295 A | 7/2013 |
| JP | 2013-218696 A | 10/2013 |
| JP | 2015-045846 A | 3/2015 |
| WO | WO 2013/154317 A1 | 10/2013 |
| WO | WO 2015/016160 A1 | 2/2015 |

* cited by examiner

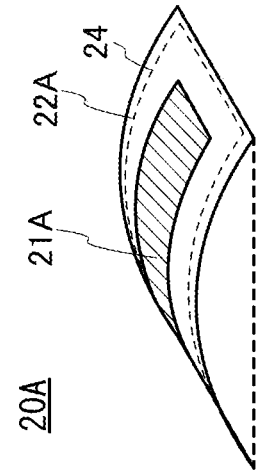
FIG. 5C
20A
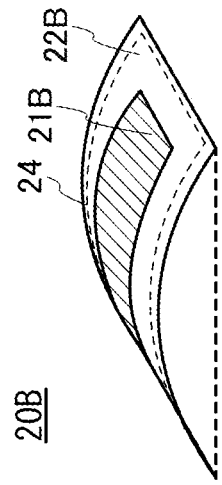
FIG. 5F
20B
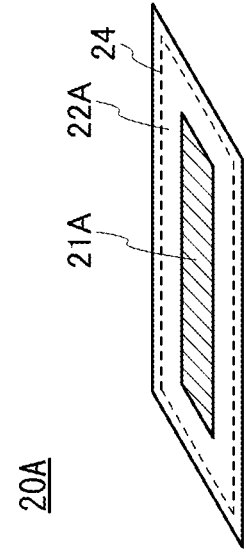
FIG. 5B
20A
FIG. 5E
20B
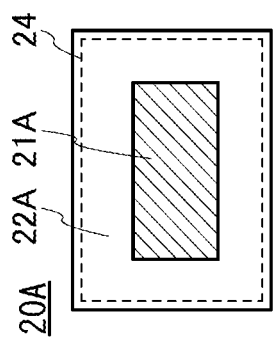
FIG. 5A
20A
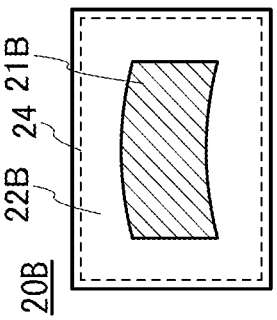
FIG. 5D
20B

DISPLAY SYSTEM AND VEHICLE

This application is a continuation of copending U.S. application Ser. No. 16/705,657, filed on Dec. 6, 2019 which is a continuation of U.S. application Ser. No. 15/587,983, filed on May 5, 2017 (now U.S. Pat. No. 10,504,489 issued Dec. 10, 2019) which are all incorporated herein by reference.

BACKGROUND OF THE INVENTION

1. Field of the Invention

One embodiment of the present invention relates to a display system and a vehicle, and particularly relates to a display system including a display panel whose display surface is curved and a vehicle including a flexible display panel.

2. Description of the Related Art

A curved display including an organic electroluminescent (EL) element has been proposed (for example, in Patent Document 1). Note that the curved display means a display including a curved display surface.

When the curved display is used for an instrument panel of a vehicle such as a car, the design improvement is expected (for example, in Patent Document 2).

REFERENCE

Patent Document

[Patent Document 1] Japanese Published Patent Application No. 2013-134295
[Patent Document 2] Japanese Published Patent Application No. 2005-112251

SUMMARY OF THE INVENTION

In order to form a complex-shaped instrument panel using a curved display, a plurality of display panels are combined. Display panels usable in a complex-shaped instrument panel can improve not only the design but also the visibility or the like. However, in order to use a plurality of display panels having shapes different from each other, preparation of the differently shaped display panels is required. For fabrication of a plurality of differently shaped display panels, the fabrication costs are increased.

An object of one embodiment of the present invention is to provide a novel display system and a vehicle or the like including the display system.

Another object of one embodiment of the present invention is to provide a novel display system which can suppress increase in the fabrication costs even when display is performed with a combination use of a plurality of differently shaped display panels, and a vehicle or the like including the display system. Another object of one embodiment of the present invention is to provide a novel display system capable of improving the visibility, and a vehicle or the like including the display system.

One embodiment of the present invention is a display system including a display panel, a correction circuit, and a memory circuit. The display panel is flexible and includes a display region and a non-display region. The memory circuit has a function of storing first data about the display region and second data about the non-display region. The non-display region has a region which overlaps with the display region when the display panel is bent. The correction circuit has a function of generating image data to be written to a pixel in the display region on the basis of the first data and the second data.

One embodiment of the present invention is a display system including a first display panel, a first correction circuit, a first memory circuit, a second display panel, a second correction circuit, and a second memory circuit. The first display panel and the second display panel are flexible. The first display panel includes a first display region and a first non-display region. The second display panel includes a second display region and a second non-display region. The first memory circuit has a function of storing first data about the first display region and second data about the first non-display region. The second memory circuit has a function of storing third data about the second display region and fourth data about the second non-display region. The first non-display region has a region which overlaps with the first display region when the first display panel is bent. The second non-display region has a region which overlaps with the second display region when the second display panel is bent. The first correction circuit has a function of generating first image data to be written to a pixel in the first display region on the basis of the first data and the second data. The second correction circuit has a function of generating second image data to be written to a pixel in the second display region on the basis of the third data and the fourth data.

In the display system of one embodiment of the present invention, the display panel preferably includes a transistor and a display element electrically connected to the transistor, and the transistor preferably includes an oxide semiconductor in its channel formation region.

In the display system of one embodiment of the present invention, the display element is preferably an organic electroluminescent element.

One embodiment of the present invention is a vehicle including an instrument panel in which the above display system is used.

Note that other embodiments of the present invention will be shown in DETAILED DESCRIPTION OF THE INVENTION below and the drawings.

According to one embodiment of the present invention, a novel display system and a vehicle or the like including the display system can be provided.

According to another embodiment of the present invention, a novel display system which can suppress increase in the fabrication costs even when display is performed with a combination use of a plurality of differently shaped display panels, and a vehicle or the like including the display system can be provided. According to another embodiment of the present invention, a novel display system capable of improving the visibility, and a vehicle or the like including the display system can be provided.

BRIEF DESCRIPTION OF THE DRAWINGS

In the accompanying drawings:
FIGS. 5A to 5F are diagrams each explaining image data for displaying images on a display panel;

DETAILED DESCRIPTION OF THE INVENTION

Hereinafter, embodiments of the present invention will be described with reference to the accompanying drawings. Note that the embodiments of the present invention can be implemented with various modes, and it is readily appreciated by those skilled in the art that modes and details can be changed in various ways without departing from the spirit and scope of the present invention. Thus, the present invention should not be interpreted as being limited to the following description of the embodiments.

<Structure of Display System>

A structure example of a display system of one embodiment of the present invention will be described. This display system can be used for a display (also referred to as a display panel) having a curved display surface.

An example of a curved display surface is an instrument panel of a vehicle such as a car. In the following examples of display systems, display systems are used in instrument panels of cars unless otherwise specified. Note that the display system of one embodiment of the present invention can be used in not only in instrument panels of cars but also in displays as long as the displays have display surfaces. Examples of vehicles other than cars include buses, trains, airplanes, and the like.

Figure 1A:
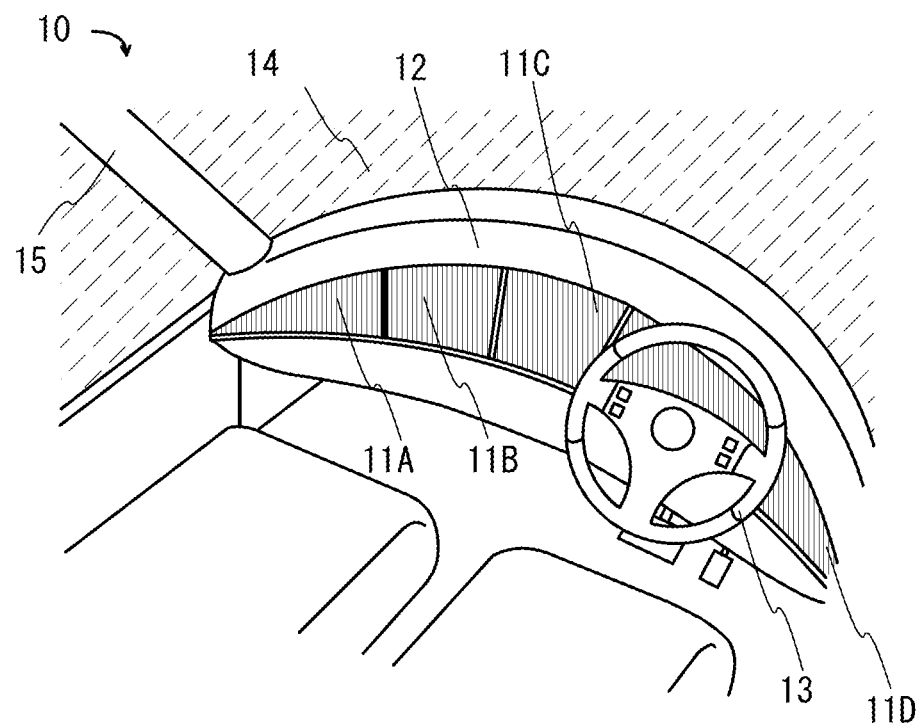
FIGS. 1A and 1B illustrate a structure of display panels in a vehicle.

In FIG. 1A, an instrument panel of a vehicle and its vicinity are illustrated, and the instrument panel is provided with a display panel capable of being used in a display system. In a vehicle 10, a plurality of display panels 11A to 11D which are provided on a dashboard 12, a steering wheel 13, a window 14, and a pillar 15 are provided.

Figure 1B:
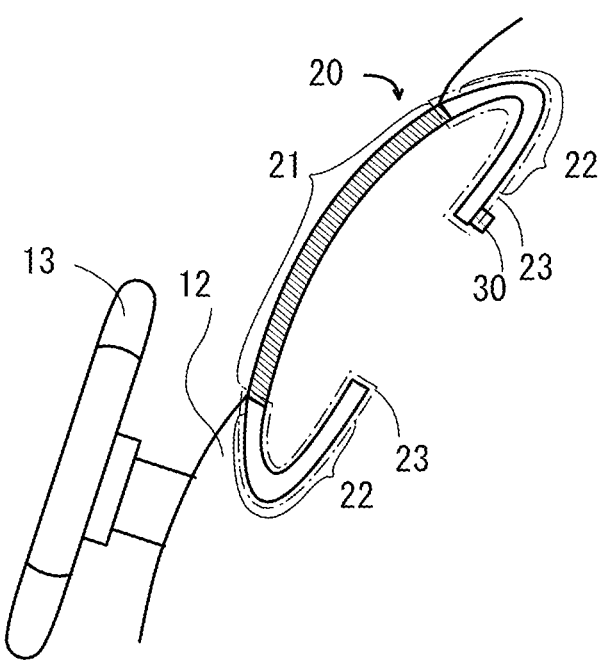

FIG. 1B is a cross-sectional schematic diagram of a display panel which is capable of being used as the display panels 11A to 11D in FIG. 1A. In FIG. 1B, a display panel 20, which is any of the display panels 11A to 11D, attached to the curved surface of the dashboard 12, in addition to the dashboard 12 and the steering wheel 13, are illustrated. In the display panel 20, a region whose surface is curved includes a display region 21, and the other regions include a non-display region 22 and a control IC 30.

A transistor, a display element, and the like of the display panel 20 are provided over a flexible base. Thus, the display panel 20 is flexible. That is, the display panel 20 can be attached to the dashboard 12 by being bent at bending portions 23 as illustrated in FIG. 1B. These bending portions 23 make the non-display region 22 and the display region 21 of the display panel 20 overlap with each other.

The control IC 30 has a function of generating image data. The control IC 30 includes a memory circuit, a correction circuit, and the like, and generates image data to be written to pixels in the display region 21.

The memory circuit of the control IC 30 has a function of storing positional data of pixels which form a display region and positional data of pixels which form a non-display region in the display panel 20. The display system of one embodiment of the present invention is formed using a plurality of display panels. The plurality of display panels each include their own display region and non-display region. Therefore, the control IC 30 in each of the display panels is provided with a memory circuit which is capable of storing positional data of pixels which form a display region and positional data of pixels which form a non-display region.

The correction circuit of the control IC 30 has a function of generating image data to be written in pixels which form a display region in the display panel 20. That is, the correction circuit of the control IC 30 corrects image data so as not to provide image data to pixels in the non-display region and provide image data only to pixels in the display region. This makes it possible to rewrite image data only in pixels contributing to display. Thus, unnecessary image data writing is eliminated, so that the power consumption can be reduced accordingly.

The control IC 30 in each of the display panels includes a correction circuit. This structure makes it possible for the display system of one embodiment of the present invention to generate and output image data for pixels in each of the display regions on the basis of information about pixels which form the display region, which differs between the display panels.

Figure 2:
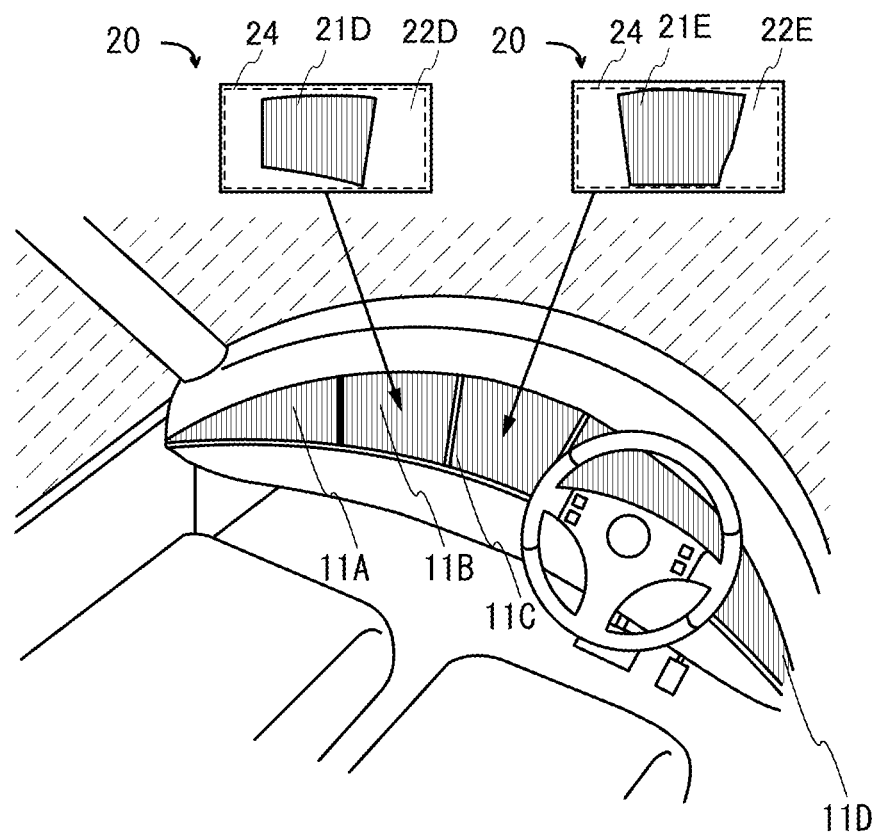
FIG. 2 illustrates a structure of display panels in a vehicle.

FIG. 2 shows a specific example of the display system of one embodiment of the present invention. FIG. 2 illustrates the plurality of display panels 11A to 11D attached to the dashboard 12 in the vehicle 10 in FIG. 1A. The display panels 11A to 11D in FIG. 2 have differently shaped display surfaces. For example, the display panel 11B and the display panel 11C in FIG. 2 have differently shaped display surfaces.

A display surface having a complex shape like the display surfaces of the display panels 11A to 11D in FIG. 2 is formed using a combination use of a plurality of differently shaped display panels. The display system of one embodiment of the present invention is effective in forming such a structure. The display system of one embodiment of the present invention includes display panels each of which has its own display region and whose non-display regions are bent. These display panels can be formed using the same display panels as base panels because they can be formed to include their own display regions and can be bent in their non-display regions. Therefore, the efficiency of mass production can be increased. The use of a display panel used for the display system of one embodiment of the present invention can reduce the fabrication costs.

Note that for the display panel in the display system of one embodiment of the present invention, a structure in which non-display regions of a plurality of display panels overlap with each other is also effective. In this case, a pixel included in a non-display region performs black display, so that the overlapping regions can be made inconspicuous. In the case of a rectangular display panel, it is difficult to bend all the four sides. Therefore, a structure in which the non-display regions perform black display and overlap with each other is effective in employing a structure in which the non-display regions along two sides of the rectangular display panel are bent and the non-display regions along the other two sides perform black display and overlap with each other.

In the case of FIG. 2, the display panel 11B and the display panel 11C can be formed using the same display panels. That is, the display panel 11B and the display panel 11C can be formed from the display panels 20 including same pixel portions 24 as illustrated in FIG. 2. The display panels 20 serving as the display panel 11B and the display panel 11C store data in their memory circuits so that a display region 21D, a display region 21E, a non-display region 22D, and a non-display region 22E are formed, and output different pieces of image data from their correction circuits on the basis of this data. The non-display regions 22D and 22E not serving as display surfaces are provided so as to have regions overlapping with the display regions when the display panels 20 are bent, so that a space for attaching the display panel 20 can be reduced. In addition, a complex-shaped display surface like the display surfaces formed using the display panels 11A to 11D in FIG. 2 can be formed, and the display system whose design is improved can be achieved.

Figure 3A:
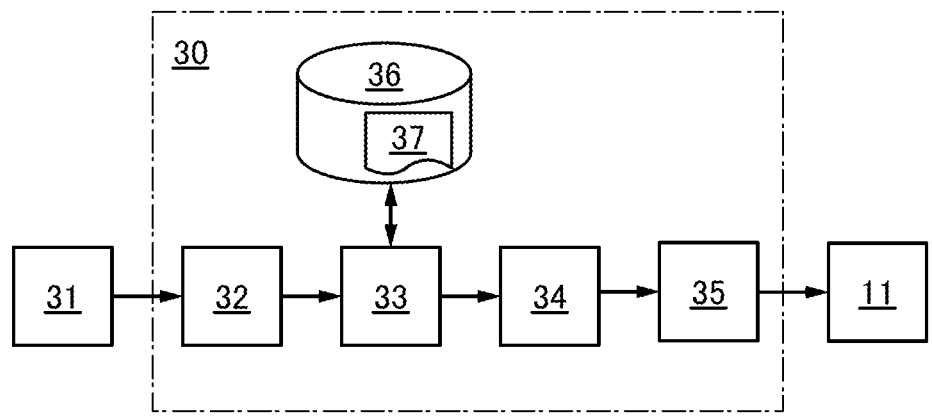
FIGS. 3A and 3B are a block diagram and a flow chart for explaining a display system.

FIG. 3A is a block diagram for explaining a structure example of the control IC 30. The control IC 30 in FIG. 3A includes, for example, an interface 32, a correction circuit 33, a timing controller 34, a display driver IC 35, and a memory circuit 36. FIG. 3A also illustrates a host controller 31 which applies image data to the control IC 30, the display panel 11 to which the control IC 30 applies corrected image data, and display region data 37 as data stored in the memory circuit 36.

In the control IC 30, pre-corrected image data which is applied from the host controller 31 is applied to the correction circuit 33 via the interface 32. In the correction circuit 33, the pre-corrected image data is corrected to image data for the display region of the display panel 11 with referring to the display region data 37 stored in the memory circuit 36. The corrected image data is applied to the display panel 11 via the timing controller 34 and the display driver IC 35.

Figure 3B:
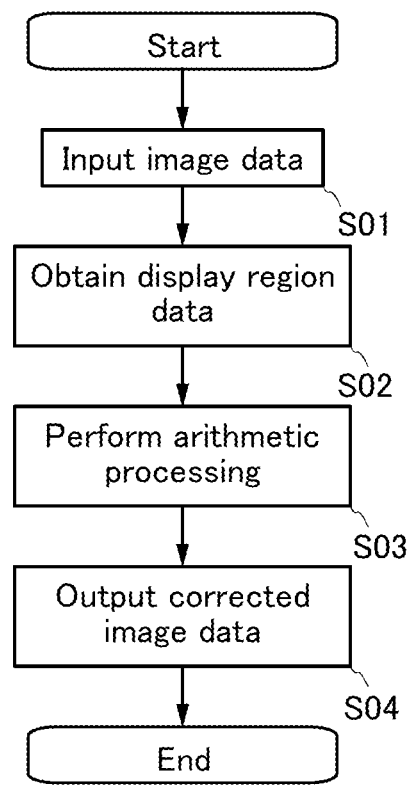

FIG. 3B is a flow chart for explaining operation of the controller IC 30 in FIG. 3A. Image data is input to the controller IC 30 (Step S01). In the correction circuit 33 of the controller IC 30, in order to correct image data which is input and applied via the interface 32 to image data for the display region, the display region data 37 stored in the memory circuit 36 is read out and obtained (Step S02). The correction circuit 33 corrects the original image data by performing arithmetic processing on the basis of the display region data 37 to image data for displaying an image in the display region (Step S03). The corrected image data is output to the display panel 11 via the timing controller 34 and the display driver IC 35 (Step S04).

Note that the arithmetic processing performed in the correction circuit 33 on the basis of the display region data 37 is image processing for processing original image data into image data which matches the shape of the display region. For example, image processing is performed in such a manner that original image data is partially removed so that image data to be applied to the pixels in the non-display region is made blank. When image data which is applied to the pixels in the non-display region is converted into image data for black display, the power consumption can be reduced in a light-emitting display panel. Alternatively, arithmetic processing is performed in which the original image data is subjected to image processing so as to be compressed or enlarged and then converted into image data for the size of the display region.

The display region data can be mask data for each pixel in the display panel 11. Specifically, the mask data of a pixel in the display region is "1" and the mask data of a pixel in the non-display region is "0" in coordinates of pixels. AND operations are performed for the mask data and the image data to be subjected to the image processing in coordinates of pixels; thus, the image data of a pixel in the non-display region can be set to "0," to black display. In contrast, the value of the image data for a pixel in the display region is not changed. This structure can freely fix the border between the display region and the non-display region.

As the other display region data, in the case of a rectangular display region, there are data of coordinates of vertexes of the rectangular region and data to determine which of the upper, lower, left, and right parts of straight lines connecting the data of vertexes becomes the non-display region (non-display region determination data). With the use of the vertex coordinate data and the non-display region determination data, the image data can be determined to be inside or outside the rectangular region, and the non-display data can be set to "0," that is, to black display. Such a structure can reduce the amount of the data stored as the display region data.

Figure 4:
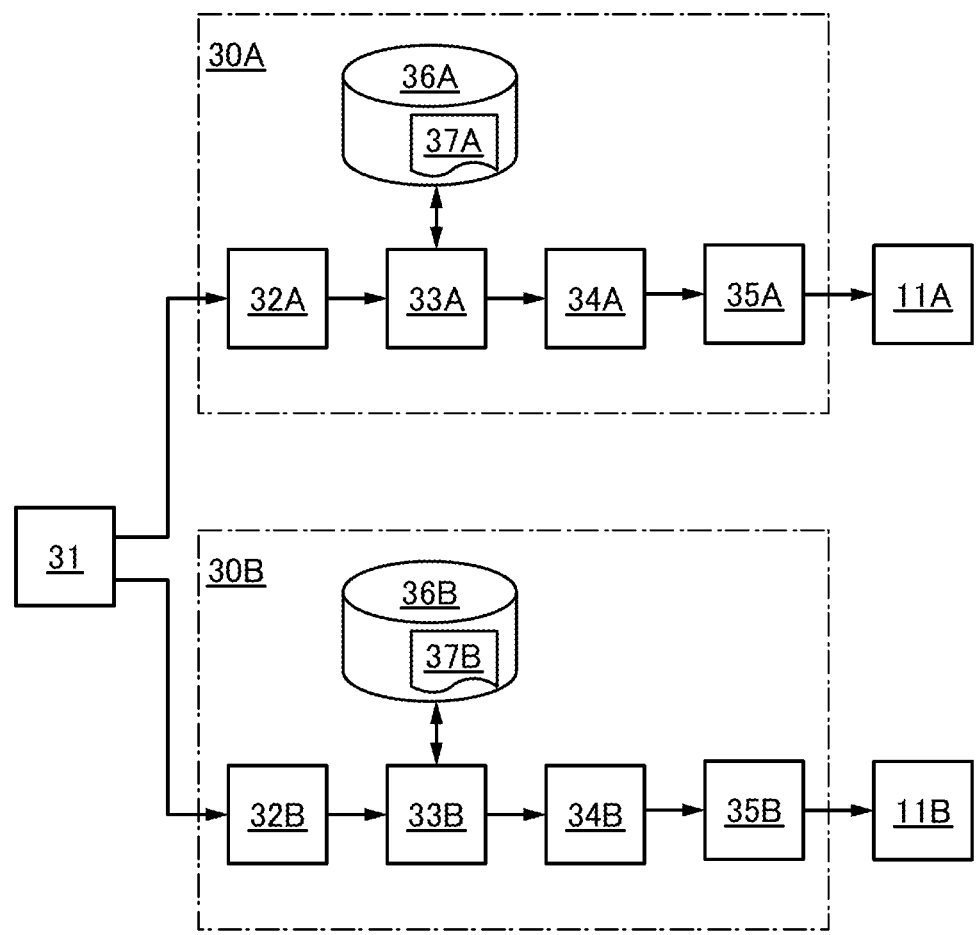
FIG. 4 is a block diagram for explaining a display system.

Note that a block diagram of the display system in which a plurality of display panels are combined is shown in FIG. 4. In FIG. 4, the display panel 11A and the display panel 11B are illustrated as the plurality of the display panels. FIG. 4 also shows a controller IC 30A which applies image data to the display panel 11A and a controller IC 30B which applies image data to the display panel 11B. The host controller 31 can apply different image data to the controller IC 30A and the controller IC 30B.

The controller IC 30A in FIG. 4 includes, for example, an interface 32A, a correction circuit 33A, a timing controller 34A, a display driver IC 35A, and a memory circuit 36A. In FIG. 4, display region data 37A is also illustrated as data which the memory circuit 36A stores. The controller IC 30B in FIG. 4 includes, for example, an interface 32B, a correction circuit 33B, a timing controller 34B, a display driver IC 35B, and a memory circuit 36B. In FIG. 4, display region data 37B is also illustrated as data which the memory circuit 36B stores.

When a display region of the display panel 11A is different from a display region of the display panel 11B in FIG. 4, the display region data 37A in the memory circuit 36A is differentiated from the display region data 37B in the memory circuit 36B. In this structure, respective pieces of image data matching the differently shaped display regions can be output to the display panel 11A and the display panel 11B.

Note that a display region of the display panel which is provided on a curved surface is configured to display images as being curved. For example, schematic diagrams in FIGS. 5A and 5B illustrate the display panel 20A which displays images as being flat. FIG. 5A is a schematic top diagram and FIG. 5B is a schematic perspective diagram. In FIGS. 5A and 5B, the pixel portion 24, a display region 21A, and a non-display region 22A are illustrated.

In FIG. 5C, the display panel 20A in FIG. 5B is illustrated as being bent. As apparent from FIG. 5C, the display panel having a curved surface is differently visible depending on shapes of the curved surface, the user's viewpoint, or the like.

Thus, in the controller IC of the display panel, image data for displaying images on the display region may be changed depending on the shapes of the curved surfaces, or the like. Even in the case of the rectangular display regions, the display region 21B is made to have a curved border as illustrated in the schematic diagrams of FIGS. 5D and 5E, for example. Note that the pixel portion 24, a display region 21B, and a non-display region 22B are illustrated in FIGS. 5D and 5E.

In FIG. 5F, the display panel 20B in FIG. 5E is illustrated as being bent. When the display region has a slightly fan-like shape like the display region 21B illustrated in FIGS. 5D and 5E, the surface shape can be seen to have less distortion when being bent. It is also possible that the image is seen three-dimensionally depending on the user's viewpoint.

Figure 6A:
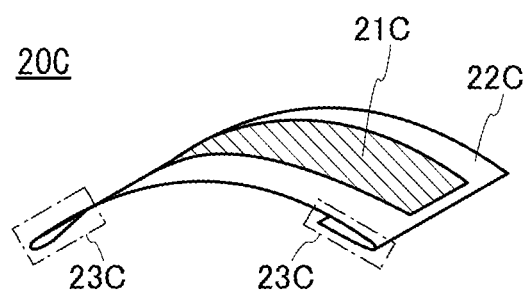
FIGS. 6A and 6B each illustrate a structure example of a display panel.

Note that the non-display regions 22A and 22B of the display panels 20A and 20B in FIGS. 5A and 5D are regions which do not contribute to displaying images. Therefore, as illustrated also in FIG. 1B, the non-display region 22A and 22B are preferably bent. FIG. 6A shows a specific example. In a display panel 20C in FIG. 6A, a display region 21C and a non-display region 22C are provided. The display panel 20C can have bending portions 23C by being bent near the borders between the display region 21C and the non-display region 22C as illustrated in FIG. 6A. The display panel 20C having the bending portions 23C can be provided with a region where the display region 21C overlaps with the non-display region 22C, and a space of the display panel can be reduced.

Figure 6B:
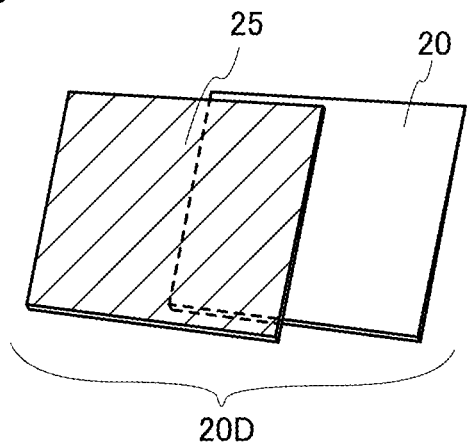

Note that a display panel which can be used in the display system of one embodiment of the present invention can be provided in combination with another component as appropriate. As an example, a display panel 20D in which the display panel 20 is combined with a polarizing plate 25 is illustrated in FIG. 6B. With the use of this structure, the direction (angle) in which the display panel is visible by the user can be limited; thus, the user can be more certain to see less distorted images.

<Memory Cell Usable in Memory Circuit>

Structure examples of a memory cell usable in the above memory circuit will be described with reference to FIGS. 7A to 7F.

Figure 7A:
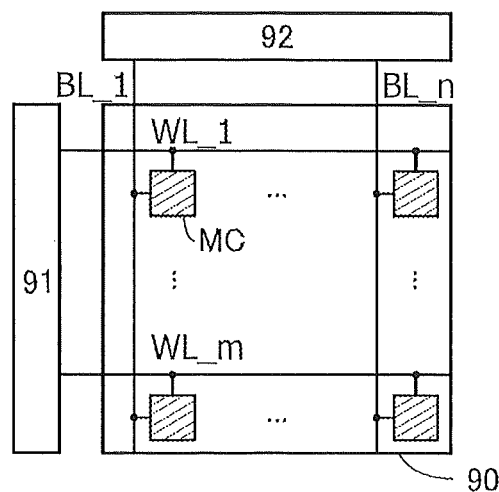
FIGS. 7A to 7F each illustrate a structure example of a memory cell in a memory circuit.

FIG. 7A is a block diagram for explaining a structure example of the memory circuit. In the block diagram in FIG. 7A, a memory cell array 90, a word line driver circuit 91, and a bit line driver circuit 92 are illustrated.

In the memory cell array 90, memory cells MC are arranged in a matrix of m rows and n columns (m and n are each a natural number). The memory cells MC are connected to word lines WL_1 to WL_m and bit lines BL_1 to BL_n. In addition to the bit lines and the word lines, the memory cells MC may be connected to a source line for supplying current, a wiring for applying voltage to a back gate of a transistor, a capacitor line for fixing a potential of one electrode of a capacitor element, or the like.

The word line driver circuit 91 is a circuit that outputs a signal for selecting memory cells MC in each row. Word lines for data writing and word lines for data reading may be provided separately as the word lines WL_1 to WL_m.

The bit line driver circuit 92 is a circuit for writing data into memory cells MC in each column, or for reading out data from the memory cells MC in each column. Bit lines for data writing and bit lines for data reading may be provided separately as the bit lines BL_1 to BL_n.

FIGS. 7B to 7F each show an example of a circuit configuration that the memory cell MC illustrated in FIG. 7A can have.

Figure 7B:
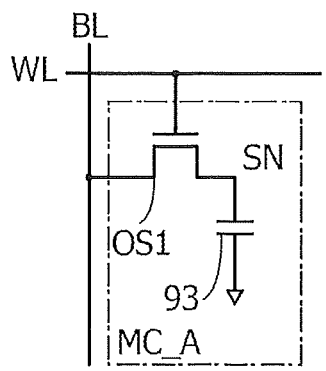

A memory cell MC_A illustrated in FIG. 7B includes a transistor OS1 and a capacitor element 93. The transistor OS1 is a transistor containing an oxide semiconductor in its semiconductor layer (an OS transistor). The OS transistor has a property of an extremely low leakage current in a non-conduction state (off-state current) as compared to a transistor containing silicon in its semiconductor layer (a Si transistor). Therefore, when the transistor OS1 is turned off, charge based on the data can be stored in a charge retention node SN. Thus, the refresh rate of the data stored in the charge retention node SN can be reduced.

Figure 7C:
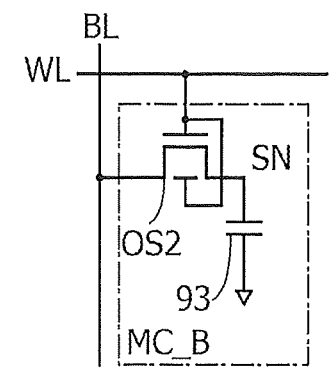

A memory cell MC B illustrated in FIG. 7C includes a transistor OS2 and the capacitor element 93. The transistor OS2 is an OS transistor. The transistor OS2 differs from the transistor OS1 illustrated in FIG. 7B in that a gate and a back gate are electrically connected to each other and voltage of the word line WL is applied from both the gate and the back gate. Adopting such a structure can increase the amount of current flowing between the source and the drain when the transistor OS2 is turned on.

Figure 7D:
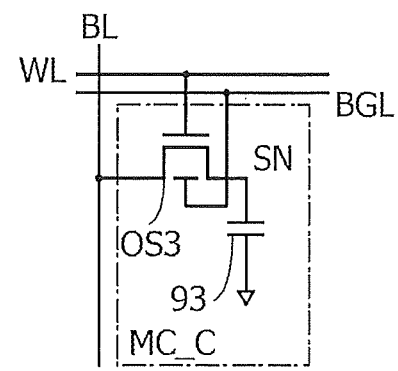

A memory cell MC_C illustrated in FIG. 7D includes a transistor OS3 and the capacitor element 93. The transistor OS3 is an OS transistor. The transistor OS3 differs from the transistor OS1 illustrated in FIG. 7B in that a back gate and a back gate line BGL are electrically connected to each other and voltage applied to the back gate is different from voltage applied to the gate. Adopting such a structure enables the amount of current flowing between the source and the drain to be controlled by controlling the threshold voltage of the transistor OS3.

Figure 7E:
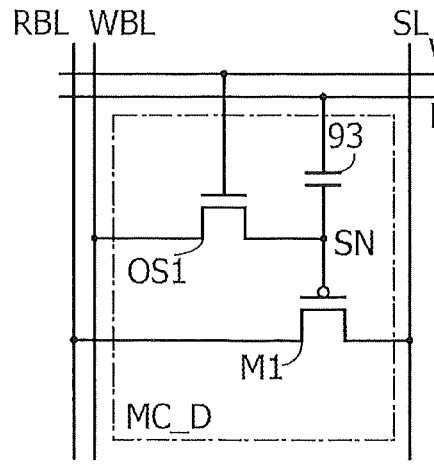

A memory cell MC_D illustrated in FIG. 7E includes the transistor OS1, a transistor M1, and the capacitor element 93. One of a source and a drain of the transistor OS1 is connected to a write bit line WBL. The other of the source and the drain of the transistor OS1 is connected to a gate of the transistor M1 and one electrode of the capacitor element 93. A gate of the transistor OS1 is connected to a write word line WWL. The other electrode of the capacitor element 93 is connected to a read word line RWL. One of a source and a drain of the transistor M1 is connected to a read bit line RBL. The other of the source and the drain of the transistor M1 is connected to a source line SL. Although the transistor M1 is a p-channel transistor in the diagram, the transistor M1 may be an n-channel transistor. When the transistor OS1 is turned off, charge based on data can be stored in the charge retention node SN. The transistor M1 is a transistor containing silicon in its channel formation region (a Si transistor). Note that the transistor OS1 can have the same structure as the transistor OS2 or OS3 described above.

Figure 7F:
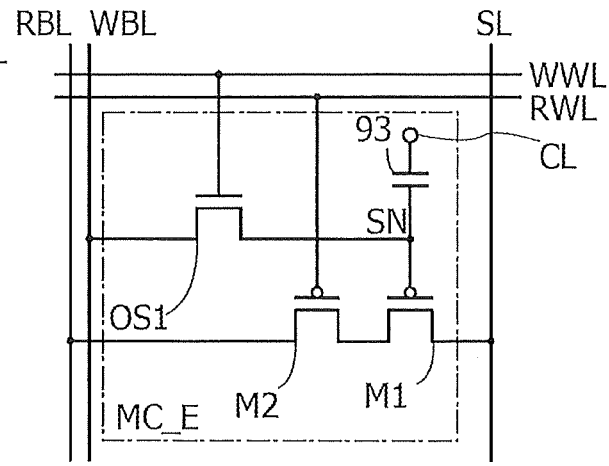

A memory cell MC_E illustrated in FIG. 7F includes the transistor OS1, the transistor M1, a transistor M2, and the capacitor element 93. One of the source and the drain of the transistor OS1 is connected to the write bit line WBL. The other of the source and the drain of the transistor OS1 is connected to a gate of the transistor M1 and one electrode of the capacitor element 93. A gate of the transistor OS1 is connected to the write word line WWL. The other electrode of the capacitor element 93 is connected to a capacitor line CL. One of the source and the drain of the transistor M1 is connected to one of a source and a drain of the transistor M2. The other of the source and the drain of the transistor M1 is connected to the source line SL. A gate of the transistor M2 is connected to the read word line RWL. The other of the source and the drain of the transistor M2 is connected to the read bit line RBL. Although the transistor M2 is a p-channel transistor in the diagram, the transistor M2 may be an n-channel transistor. When the transistor OS1 is turned off, charge based on data can be stored in the charge retention node SN. The transistor M2 is a Si transistor. Note that the transistor OS1 can have the same structure as the transistor OS2 or OS3 described above.

Note that the structures of the memory cells illustrated in FIGS. 7B to 7F are effective especially when data to be stored in the memory circuit is increased. As compared to the structure where the memory cells in the memory circuit are constituted of static RAM (SRAM), the structure with one to three memory cells can inhibit an increase in a circuit area. In particular, the structures of the memory cells illustrated in FIGS. 7B to 7D are effective in inhibiting an increase in a circuit area.

In addition, an OS transistor has transistor characteristics which are less likely to change when the operation temperature is increased than a Si transistor. Therefore, the memory circuit can be more certain to operate in a temperature range for onboard use, such as in a car or the like.

Note that the circuit configurations illustrated in FIGS. 7B to 7F are merely examples, and any other configurations can be employed as long as one embodiment of the present invention can be achieved.

<Structure Example of Pixel in Display Panel>

In this section, a structure example of a pixel in a display panel which can be used in the above display system will be described.

Figure 8A:
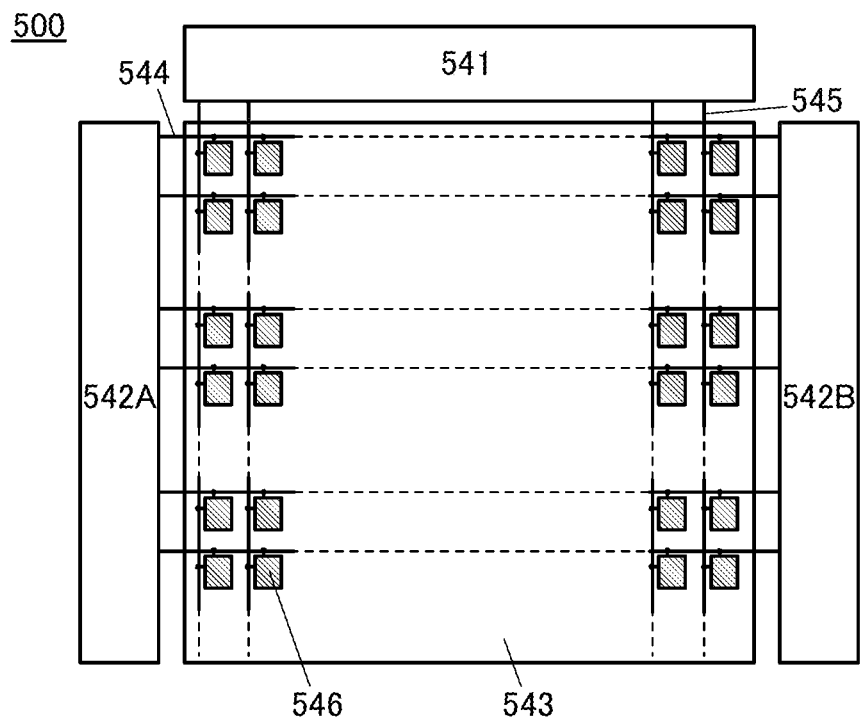
FIGS. 8A and 8B illustrate a structure example of a pixel in a display panel.

FIG. 8A is a block diagram showing a structure example of the display panel.

A display panel 500 in FIG. 8A includes a driver circuit 541, a driver circuit 542A, a driver circuit 542B, and a pixel portion 543. Note that the driver circuits 541, 542A, and 542B are collectively referred to as a driver circuit or a peripheral driver circuit in some cases.

The driver circuits 542A and 542B can function as, for example, scan line driver circuits. The driver circuit 541 can function as, for example, a signal line driver circuit. Note that one of the driver circuits 542A and 542B may be omitted. In addition, some sort of circuit facing the driver circuit 541 with the pixel portion 543 provided therebetween may be provided.

The display panel 500 illustrated as an example in FIG. 8A includes p wirings 544 that are arranged substantially parallel to each other and whose potentials are controlled by the driver circuit 542A and/or the driver circuit 542B, and q wirings 545 that are arranged substantially parallel to each other and whose potentials are controlled by the driver circuit 541 (p and q are each a natural number of 1 or more). The pixel portion 543 includes a plurality of pixels 546 arranged in a matrix. The pixel 546 includes a pixel circuit and a display element.

When every three pixels 546 function as one pixel, full-color display can be provided. Each of the three pixels 546 controls the transmittance, reflectance, amount of emitted light, or the like for emitting red light, green light, or blue light. The light colors controlled by the three pixels 546 are not limited to the combination of red, green, and blue, and may be yellow, cyan, and magenta.

A pixel 546 that controls white light may be added to the pixels controlling red light, green light, and blue light so that the four pixels 546 will collectively function as one pixel. The addition of the pixel 546 that controls white light can heighten the luminance of the display region. When the number of the pixels 546 functioning as one pixel is increased to use red, green, blue, yellow, cyan, and magenta in appropriate combination, the range of color reproduction can be widened.

A wiring 544_g in a g-th row (g is a natural number of more than or equal to 1 and less than or equal to p) is electrically connected to q pixels 546 in the g-th row among the plurality of pixels 546 arranged in p rows and q columns in the pixel portion 543. A wiring 545_h on the h-th column (his a natural number of more than or equal to 1 and less than or equal to q) is electrically connected to p pixels 546 on the h-th column among the plurality of pixels 546 arranged in p rows and q columns.

The display panel 500 can employ various modes and include various display elements. Examples of the display elements are elements including a display medium whose luminance or the like is changed by electric action, such as an electroluminescent (EL) element (e.g., an organic EL element, an inorganic EL element, and an EL element containing organic and inorganic materials) and the like.

Figure 8B:
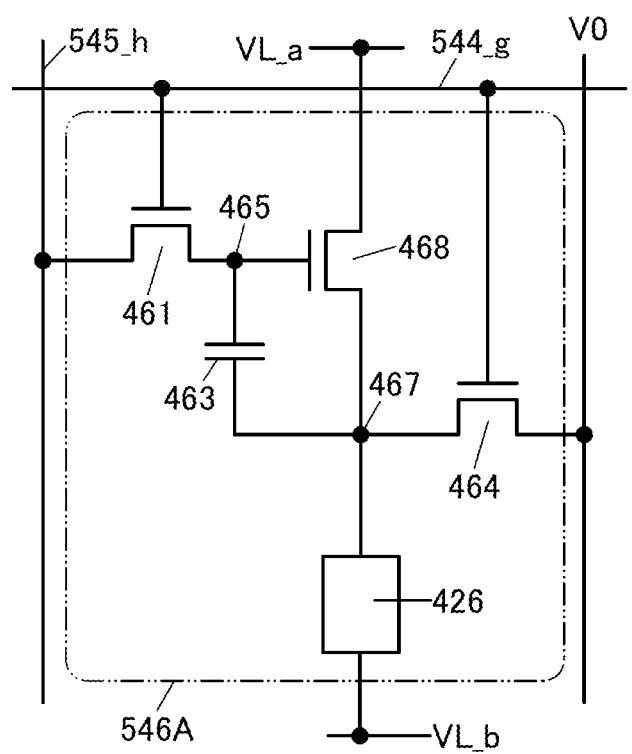

A pixel 546A in FIG. 8B includes a transistor 461, a capacitor element 463, a transistor 468, a transistor 464, and a light-emitting element 426 capable of functioning as a display element.

One of a source electrode and a drain electrode of the transistor 461 is electrically connected to the wiring 545_h. A gate electrode of the transistor 461 is electrically connected to the wiring 544_g. The wiring 545_h applies a video signal.

The transistor 461 has a function of controlling writing of a video signal to a node 465.

One of a pair of electrodes of the capacitor element 463 is electrically connected to the node 465, and the other is electrically connected to a node 467. The other of the source electrode and the drain electrode of the transistor 461 is electrically connected to the node 465.

The capacitor element 463 functions as a storage capacitor for storing data written to the node 465.

One of a source electrode and a drain electrode of the transistor 468 is electrically connected to a potential supply line VL_a, and the other is electrically connected to the node 467. A gate electrode of the transistor 468 is electrically connected to the node 465.

One of a source electrode and a drain electrode of the transistor 464 is electrically connected to a wiring VO, and the other is electrically connected to the node 467. A gate electrode of the transistor 464 is electrically connected to the wiring 544_g.

One of an anode and a cathode of the light-emitting element 426 is electrically connected to a potential supply line VL_b, and the other is electrically connected to the node 467.

As the light-emitting element 426, an organic electroluminescent element (also referred to as an organic EL element) or the like can be used, for example. Note that the light-emitting element 426 is not limited thereto; an inorganic EL element including an inorganic material can be used, for example.

A high power supply potential VDD is applied to one of the potential supply line VL_a and the potential supply line VL_b, and a low power supply potential VSS is applied to the other, for example.

In the display panel 500 including the pixel 546A in FIG. 8B, the pixels 546 are sequentially selected row by row by the driver circuit 542A and/or the driver circuit 542B, so that the transistor 461 is turned on and a video signal is written to the node 465.

The pixel 546A in which the data has been written to the node 465 is brought into a holding state when the transistors 461 and 464 are turned off. The amount of current flowing between the source electrode and the drain electrode of the transistor 468 is controlled on the basis of the potential of the data written to the node 465. The light-emitting element 426 emits light with a luminance determined by the amount of flowing current. This operation is sequentially performed row by row; thus, an image can be displayed.

The transistors 461, 464, and 468 may be transistors with back gates. In that case, in each of the transistors 461, 464, and 468, the gate may be electrically connected to the back gate.

The above transistors 461, 464, and 468 are preferably OS transistors. As described above, the off-state current of OS transistors is extremely low. Therefore, OS transistors can continue storing the potential of data written once to the node 465. When the same image is displayed, the refresh rate, a frequency of data writing, can be reduced; thus, the power consumption can be reduced.

In addition, OS transistors can be formed at temperatures lower than that in the case of transistors in which their channel formation regions are formed using low-temperature polysilicon (LTPS). Thus, the upper temperature limit of the base for forming the OS transistors can be lowered, which allows a range of selecting the materials to be broadened. In particular, a several-µm-thick base can be selected as a base layer of a resin such as polyimide; therefore, the display panel can be lighter and thinner. In addition, the display panel can be easily bent.

The organic EL element used as the light-emitting element 426 has a preferable response speed at low temperatures as compared to liquid crystal elements. The display panels are used in a wide range of ambient temperatures when being used for cars. Even in such a case, the display panel in which organic EL elements are used as the light-emitting elements can suppress reduction in the display quality.

In addition, the display panel in which organic EL elements are used as the light-emitting elements has little change in the luminance due to a difference of the viewpoint positions as compared to a display panel using liquid crystal elements. That is, the viewing angle dependence is small. When the display panels are used for cars, information of the meter or the like can be correctly displayed without blur.

<Example of Using Display System for Vehicle>

A display panel capable of being used in the above display system is attachable to a surface so as to fit the shape of the surface. Hereinafter, examples in which the display panel is used for the periphery of a driver's seat in a car, which is a vehicle, will be described.

Figure 9:
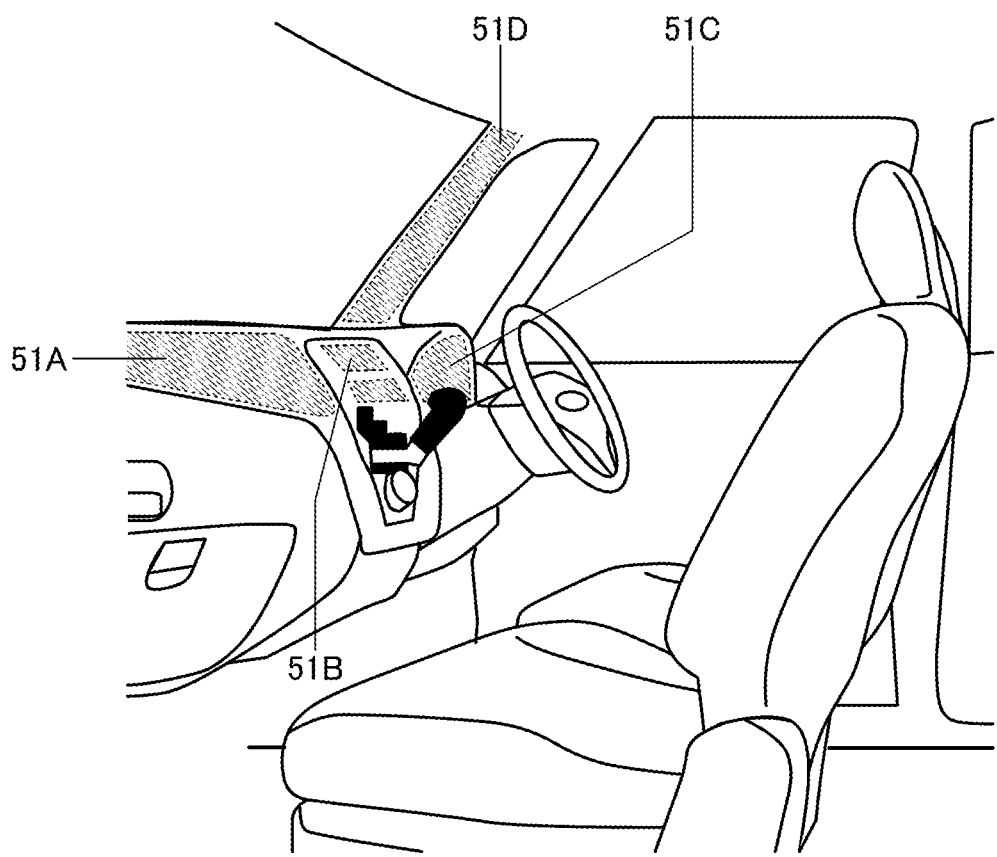
FIG. 9 illustrates a structure of display panels in a vehicle.

FIG. 9 illustrates a front glass and its vicinity inside a car, for example. In FIG. 9, display panels 51A to 51C which are attached to a dashboard and a display panel 51D which is attached to a pillar are illustrated.

The display panels 51A to 51C can provide a variety of kinds of information such as navigation data, a speedometer, a tachometer, a mileage, a fuel meter, a gearshift indicator, and air-condition setting. The content, layout, or the like of the display on the display panels can be changed freely to suit the user's preferences, so that the design can be improved. The display panels 51A to 51C can also be used as lighting devices.

The display panel 51D can compensate for the view hindered by the pillar (blind areas) by displaying an image taken by an imaging unit provided for the car body. That is, displaying an image taken by an imaging unit provided on the outside of the car body leads to elimination of blind areas and enhancement of safety. In addition, showing an image so as to compensate for the area which the driver cannot see makes it possible for the driver to confirm safety easily and comfortably. The display panel 51D can also be used as a lighting device.

Figure 10:
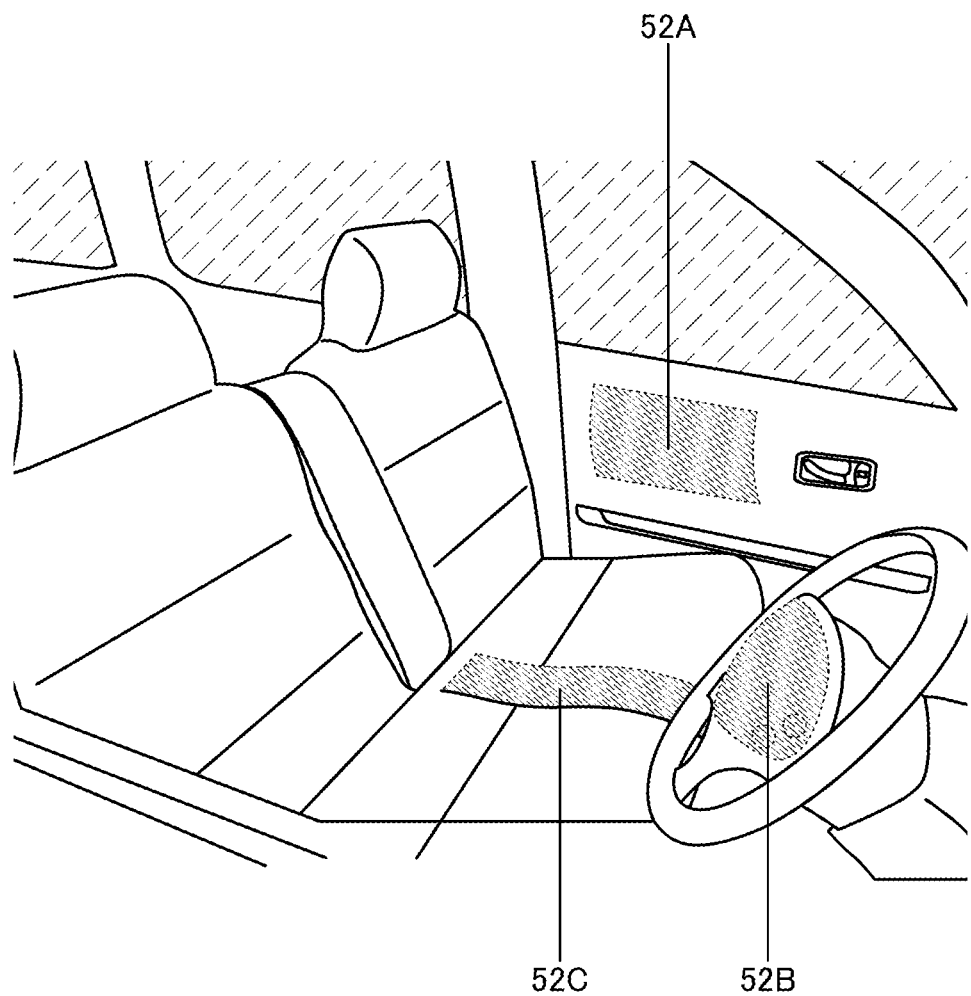
FIG. 10 illustrates a structure of display panels in a vehicle.

FIG. 10 illustrates the inside of a car in which a bench seat is used as a driver seat and a front passenger seat. FIG. 10 illustrates a display panel 52A which is provided on a door, a display panel 52B which is provided on a steering wheel, and a display panel 52C which is provided in the middle of the seating surface of the bench seat.

The display panel 52A can compensate for the view hindered by the door by displaying an image taken by an imaging unit provided for the car body, for example.

The display panels 52B and 52C can provide a variety of kinds of information such as navigation data, a speedometer, a tachometer, a mileage, a fuel meter, a gearshift indicator, and air-condition setting. The content, layout, or the like of the display on the display panels can be changed freely to suit the user's preferences. The display panels 52B and 52C can also be used as lighting devices.

The display panels provided everywhere inside the car as illustrated in FIG. 9 and FIG. 10 are effectively used as units for transmitting an urgent signal out of the car by being used as lighting devices. In the case where an abnormal health condition of the user (driver) is sensed by a sensor or the like, for example, the display panels are made flash on and off at the highest luminance. The display panels in the display system of one embodiment of the present can be provided everywhere in the car and thus can transmit information effectively around the car as compared to text information and a hazard lamp.

Figure 11A:
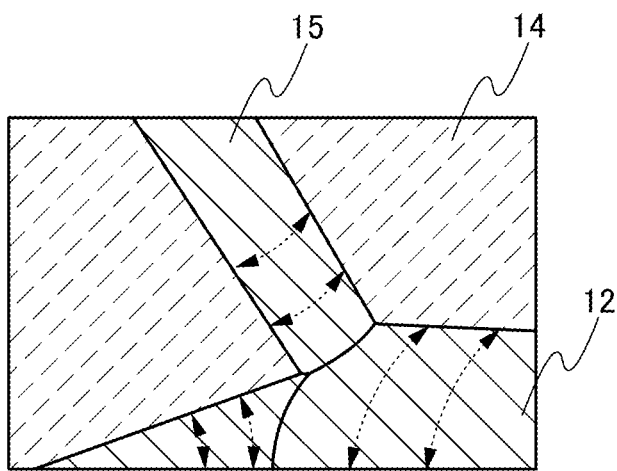
FIGS. 11A and 11B illustrate a structure of display panels in a vehicle.
Figure 11B:
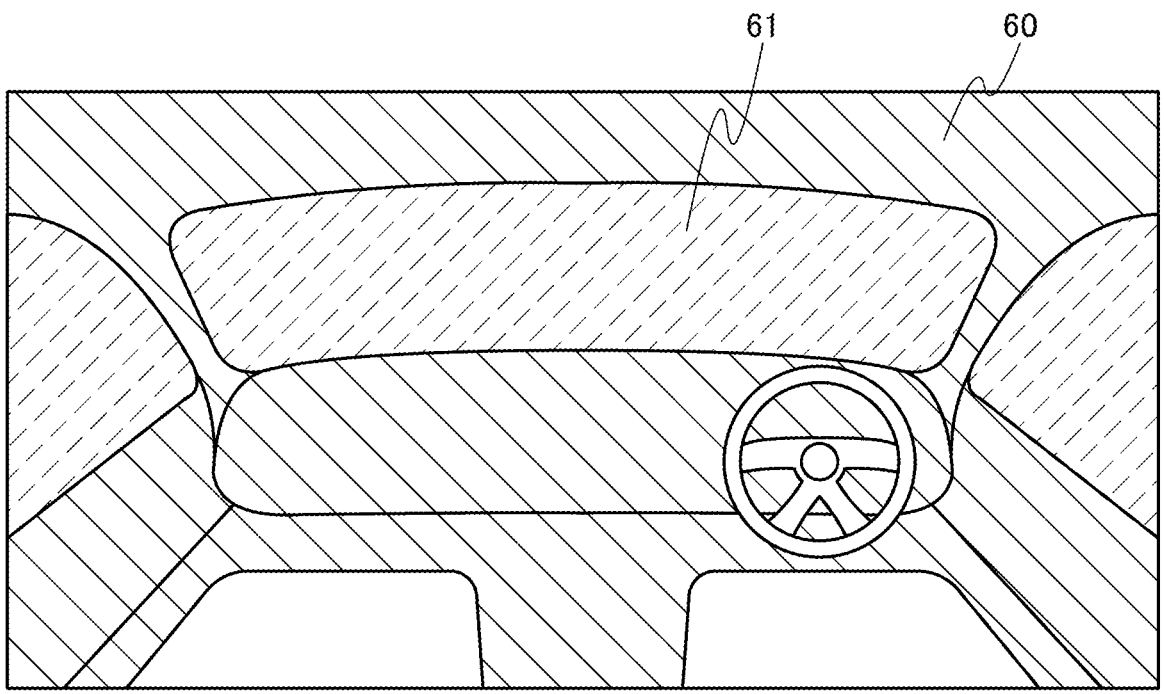

Like the above display panel, the display system of one embodiment of the present invention can be attached to a curved surface. Like the above display panels 51A to 51D and display panels 52A to 52C, for example, the display system can be attached everywhere inside the car. That is, the display system can be attached even to a curved surface such as the dashboard 12 and the pillar 15 in FIG. 11A. Therefore, a display panel 60 can be provided on the inner surface of the car body except for windows 61 as illustrated in FIG. 11B. This structure can display images outside of the car body except for the outside of the windows 61, so that blind areas can be eliminated and the safety can be enhanced.

Figure 12A:
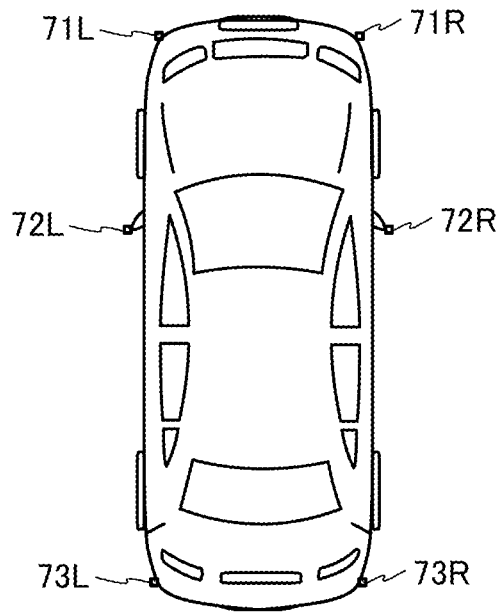
FIGS. 12A and 12B illustrate arrangement of imaging devices and display panels in a vehicle.

When the display panels are provided on the inner surfaces of the car body except for the windows 61 as illustrated in FIG. 11B, a plurality of imaging devices 71L to 73L, and 71R to 73R are provided on the outer side of the car body as illustrated in FIG. 12A. Note that two or more imaging devices are preferably arranged to obtain information about a distance to an object.

Figure 12B:
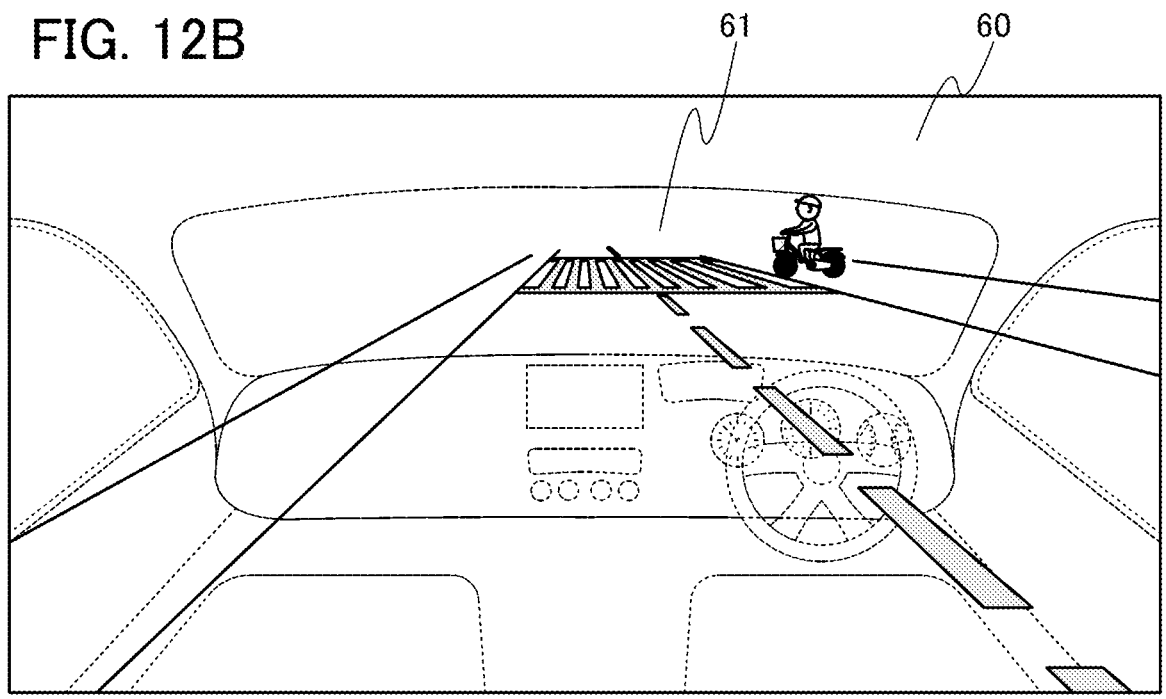

The structures in FIG. 11B and FIG. 12A make it possible to display the images outside of the car body except for outside of the windows 61 as illustrated in FIG. 12B. Thus, the vehicle can compensate for the user's blind areas and enhance its safety.

In the structure including the display panels 60 provided on the inner surfaces of the car body except for the windows 61, a position on which the meter or the like is displayed is changeable because the display panels are provided on a variety of places. In this case, the display positions can be switched freely to prevent the meter or the like from being difficult to see under direct sunlight.

<Examples of Vehicle>

Examples of a vehicle will be described.

The display system of one embodiment of the present invention can be used for a vehicle including a surface on which a display panel can be provided. Specific examples of the vehicles are shown in FIGS. 13A to 13D.

Figure 13A:
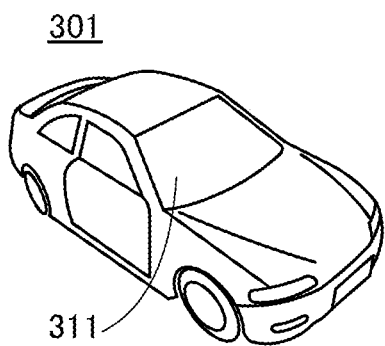
FIGS. 13A to 13D show examples of vehicles.

FIG. 13A illustrates a car 301. The car 301 includes a window 311. A vehicle of one embodiment of the present invention can be the car 301 including the window 311. The display panel used for the display system can be provided on the surface inside the car 301. This structure enables the display panel in the car 301 to display outside images of the car 301. Thus, the car 301 can reduce the blind areas excluding the window 311.

Figure 13B:
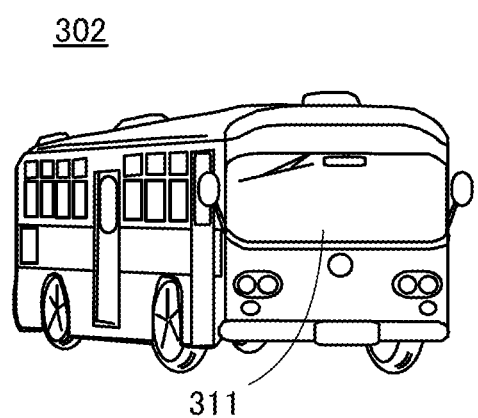

FIG. 13B illustrates a bus 302. The bus 302 includes the window 311. A vehicle of one embodiment of the present invention can be the bus 302 including the window 311. The display panel used for the display system can be provided on the surface inside the bus 302. This structure enables the display panel in the bus 302 to display outside images of the bus 302. Thus, the bus 302 can reduce the blind areas excluding the window 311.

Figure 13C:
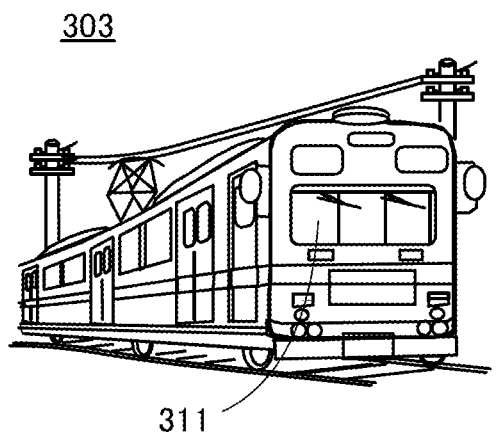

FIG. 13C illustrates a train 303. The train 303 includes the window 311. A vehicle of one embodiment of the present invention can be the train 303 including the window 311. The display panel used for the display system can be provided on the surface inside the train 303. This structure enables the display panel in the train 303 to display outside images of the train 303. Thus, the train 303 can reduce the blind areas excluding the window 311.

Figure 13D:
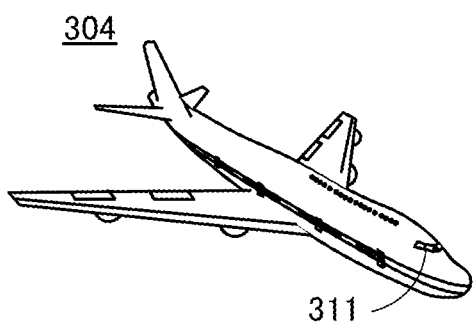

FIG. 13D illustrates an airplane 304. The airplane 304 includes the window 311. A vehicle of one embodiment of the present invention can be the airplane 304 including the window 311. The display panel used for the display system can be provided on the surface inside the airplane 304. This structure enables the display panel in the airplane 304 to display outside images of the airplane 304. Thus, the airplane 304 can reduce the blind areas excluding the window 311.

<Notes on Description of this Specification and the Like>

In this specification and the like, ordinal numbers such as "first," "second," and "third" are used in order to avoid confusion among components. Thus, the terms do not limit the number or order of components.

In a block diagram in this specification and the like, components are functionally classified and shown by blocks that are independent of each other. However, in an actual circuit and the like, such components are sometimes hard to classify functionally, and there is a case in which one circuit is concerned with a plurality of functions or a case in which a plurality of circuits are concerned with one function. Therefore, blocks in a block diagram do not necessarily show components described in the specification, which can be explained with another term as appropriate depending on the situation.

The same elements or elements having similar functions, elements formed using the same material, elements formed at the same time, or the like in the drawings are denoted by the same reference numerals, and the description thereof is not repeated in some cases.

In this specification or the like, the terms "one of a source and a drain" (or a first electrode or a first terminal) and "the other of the source and the drain" (or a second electrode or a second terminal) are used to describe the connection relation of a transistor. This is because a source and a drain of a transistor are interchangeable depending on the structure, operation conditions, or the like of the transistor. Note that the source or the drain of the transistor can also be referred to as a source (or drain) terminal, a source (or drain) electrode, or the like as appropriate depending on the situation.

In this specification and the like, "voltage" and "potential" can be replaced with each other. The term "voltage" refers to a potential difference from a reference potential. When the reference potential is a ground potential, for example, "voltage" can be replaced with "potential." The ground potential does not necessarily mean 0 V. Potentials are relative values, and the potential applied to a wiring or the like is changed depending on the reference potential, in some cases.

In this specification and the like, a switch is conducting (on state) or not conducting (off state) to determine whether current flows therethrough or not. Alternatively, the switch is an element having a function of selecting and changing a current path.

Examples of a switch are an electrical switch, a mechanical switch, and the like. That is, any element can be used as a switch as long as it can control current, without limitation to a certain element.

In the case of using a transistor as a switch, an "on state" of the transistor refers to a state in which a source and a drain of the transistor are electrically short-circuited. Furthermore, an "off state" of the transistor refers to a state in which the source and the drain of the transistor are electrically disconnected. In the case where a transistor operates just as a switch, the polarity (conductivity type) of the transistor is not particularly limited to a certain type.

In this specification and the like, when it is described that "A and B are connected to each other," the case where A and B are electrically connected to each other is included in addition to the case where A and B are directly connected to each other. Here, the expression "A and B are electrically connected" means the case where electric signals can be transmitted and received between A and B when an object having any electric action exists between A and B.

This application is based on Japanese Patent Application serial No. 2016-094469 filed with Japan Patent Office on May 10, 2016, the entire contents of which are hereby incorporated by reference.

What is claimed is:

1. A display system comprising:
    a flexible display panel comprising:
        a display region; and
        a non-display region; and
    a control IC attached to the non-display region, the control IC comprising:
        a memory circuit configured to store display region data;
        a correction circuit configured to compress or enlarge first image data based on the display region data and convert the compressed or enlarged data into second image data for a size of the display region; and
        a display driver IC configured to output the second image data to the flexible display panel,
    wherein the display region has a curved surface,
    wherein the second image data is configured to have less distortion in the display region on the curved surface,
    wherein the flexible display panel comprises a bending portion near a border between the display region and the non-display region and is configured to be bent at the bending portion, and
    wherein when the flexible display panel is bent, the non-display region overlaps with the display region.

2. The display system according to claim 1, wherein the display region displays an image as being flat.

3. The display system according to claim 1, wherein the border between the display region and the non-display region is freely fixed.

4. The display system according to claim 1,
    wherein the correction circuit is configured to generate third image data to be applied to the non-display region, and
    wherein the third image data is blank or black display.

5. The display system according to claim 1,
wherein the memory circuit comprises a memory cell,
wherein the memory cell comprises:
- a first transistor whose semiconductor layer includes an oxide semiconductor; and
- a capacitor, one electrode of the capacitor electrically connected to one of a source and a drain of the first transistor.

6. The display system according to claim 5,
wherein the memory cell further comprises a second transistor whose semiconductor layer includes silicon, and
wherein a gate of the second transistor is electrically connected to the one electrode of the capacitor and the one of the source and the drain of the first transistor.

7. A display system comprising:
a host controller;
a first flexible display panel comprising:
- a first display region; and
- a first non-display region,
a first control IC comprising:
- a first memory circuit configured to store first display region data;
- a first correction circuit configured to receive first image data from the host controller and compress or enlarge the first image data based on the first display region data and convert the enlarged or compressed data into second image data for a size of the first display region; and
- a first display driver IC configured to output the second image data to the first flexible display panel,
a second flexible display panel comprising:
- a second display region; and
- a second non-display region, and
a second control IC comprising:
- a second memory circuit configured to store second display region data;
- a second correction circuit configured to receive third image data from the host controller and process the third image data based on the second display region data to generate fourth image data to be written to the second display region; and
- a second display driver IC configured to output the fourth image data to the second flexible display panel, wherein the first display region and the second display region are different in size and shape,
wherein the first flexible display panel comprises a bending portion near a border between the first display region and the first non-display region and is configured to be bent at the bending portion, and
wherein when the first flexible display panel is bent, the first non-display region overlaps with the first display region.

8. The display system according to claim 7,
wherein at least one of the first display region and the second display region has a curved surface, and
wherein the first display region and the second display region each display an image as being flat.

9. The display system according to claim 7,
wherein the shape of the first display region is rectangular,
wherein the first flexible display panel is bent along two sides of the rectangular first display region, and
wherein the other two side of the rectangular first display region overlaps with the second non-display region.

10. The display system according to claim 7,
wherein the first display region data and the second display region data are different from each other.

11. The display system according to claim 7,
wherein the first correction circuit is configured to generate fifth image data to be applied to the first non-display region, and
wherein the fifth image data is blank or black display.

12. The display system according to claim 7,
wherein the first memory circuit comprises a memory cell,
wherein the memory cell comprises:
- a first transistor whose semiconductor layer includes an oxide semiconductor; and
- a capacitor, one electrode of the capacitor electrically connected to one of a source and a drain of the first transistor.

13. The display system according to claim 12,
wherein the memory cell further comprises a second transistor whose semiconductor layer includes silicon, and
wherein a gate of the second transistor is electrically connected to the one electrode of the capacitor and the one of the source and the drain of the first transistor.

* * * * *